Sept. 23, 1969 R. J. DEISENROTH 3,468,738
METHOD OF BONDING METAL OBJECTS TO GLASS PANELS
Filed March 29, 1966

INVENTOR.
ROBERT J. DEISENROTH
BY
WILSON, SETTLE, BATCHELDER
ATT'YS. & CRAIG

United States Patent Office 3,468,738
Patented Sept. 23, 1969

3,468,738
METHOD OF BONDING METAL OBJECTS TO GLASS PANELS
Robert J. Deisenroth, Elkhart, Ind., assignor to Excel Corporation, Elkhart, Ind., a corporation of Indiana
Filed Mar. 29, 1966, Ser. No. 538,369
Int. Cl. B32b 1/06, 3/02; C03c 27/04
U.S. Cl. 156—293      8 Claims

ABSTRACT OF THE DISCLOSURE

The method of bonding metal objects to glass panels is accomplished by first partially curing liquid resinous adhesive material to a gel form. The gel material is placed between and in contact with a metal frame and the glass panel. The gel material is then further cured to a more rigid solid condition in which it bonds the glass panel to the metal frame and provides a solid bed for the panel in the frame.

CROSS-REFERENCE TO RELATED APPLICATION

This application is related to a co-pending application of Robert J. Deisenroth, Ser. No. 222,590, filed Sept. 10, 1962, now Patent No. 3,263,014, issued July 26, 1966, and assigned to the present assignee.

BACKGROUND OF THE INVENTION

This invention relates generally to the bonding of metal objects to glass panels, and more particularly to a method of bedding a glass panel into a metal frame wherein liquid resinous adhesive material is first partially cured to a gel form, the gel material is placed between and in contact with the metal frame and the glass panel, and the gel material is further cured to a more rigid solid condition in which it bonds the glass panel to the metal frame and provides a solid bed for the panel in the frame.

The method of the present invention is useful in, although not restricted to, the bedding of glass panels into frames to provide sashes for automobile windows. Glass panels for automobile windows have in the past been bedded into metal frames by the use of rubber strips. A worker folds a rubber strip about a marginal edge of a glass panel and then inserts the glass panel into the recess of a channel-shaped metal frame member. There is no firm bond between the rubber material and either the metal frame or the glass panel. Excess rubber has to be trimmed off with a knife, and different thicknesses of glass require rubber strips of different thicknesses. The method using rubber strips is carried out manually, and consequently labor costs are relatively high.

It has recently been proposed to bed glass panels into metal frames by injecting heat curable liquid bedding material between a marginal edge of a panel and the frame in which the panel is to be bedded and then heat the liquid bedding material to cure it to a solid form in which it is adherent to both the glass panel and the metal frame. In this method, the edge of the panel is inserted into the recess of the frame member and liquid bedding material is injected into the recess under pressure. Because of the pressure of injection, it has been necessary to seal off the space between the panel member and the metal frame so as to form a liquid-tight cavity into which the bedding material is injected. Such a method is described in a co-pending application of Robert J. Deisenroth, Ser. No. 222,590, filed Sept. 10, 1962 which has matured into the above-mentioned U.S. Patent No. 3,263,014, and is assigned to the assignee of this application.

The method of the application has many advantages over the method using rubber strips. It can be mechanized to a greater degree, it automatically compensates for different glass thicknesses, it requires no trimming of excess material and no special cleanup procedure is necessary, and it provides a water-tight seal between the panel and the frame without the use of separate sealers. The requirement for pressure injection of the material and the use of sealing elements between the panel and the frame are disadvantages of the method of the application which it would be desirable to overcome. It would also be desirable to have a general method of bonding metal objects to glass panels which does not require the use of pressure injection nor the provision of seals between the metal object and the glass panel.

In the method of the present invention, a resinous liquid adhesive or bedding material is first cured from its liquid form to a partially cured form in which it is a soft, pliable gel. This gel is then shaped in a convenient form for handling, such as a length of material in the nature of a length of rope. This rope-like length of gel is then placed between the metal frame and the marginal edge of the glass panel to be bedded therein, and this may be done by either placing the rope-like gel at the bottom of the recess of the frame member and then inserting the panel into the frame, or by placing the rope-like gel on the marginal edge of the panel and then inserting the panel into the frame member. In either case, the gel is squeezed into the spaces between the panel edge and the frame. The gel is then heated to fully cure it to a solid more rigid form which is strongly adherent both to the glass panel and to the metal frame. This latter heating step may be carried out by placing the assembly of frame, glass panel and gel in an oven for whatever time is needed to fully cure the gel material. This method is advantageous over the method wherein liquid adhesive is injected into a liquid-tight cavity formed by the panel and the frame because no pressure injection or sealing elements are required. It does, however, retain the advantages of the injection fill method over the method using rubber strips; that is, it provides a strong bond between the panel and the frame, different thicknesses of glass are compensated for automatically, no trimming is required, and no special cleanup procedures are required either. The gel material can be handled conveniently without the possibility of spillage or leakage as is the case when liquid bedding material is injected between the panel and frame. The method is versatile in that it can be used to bond metal objects other than frames to glass panels.

Accordingly, it is an object of this invention to provide a method of bonding metal objects to glass panels by placing a gel which has been partially cured from liquid adhesive material between the metal object and the panel and fully curing the gel material to a more rigid solid condition in which it adheres strongly to both the metal object and the glass panel.

Another object of the invention is to provide a bonding or bedding material by partially curing a liquid adhesive material to an intermediate stage of cure in which the material is a soft, pliable gel.

Another object of the invention is to provide a method of bedding wherein liquid adhesive material is cured to a gel form by heat, and after the adhesive gel material has been placed in contact with a metal body and a glass panel it is further cured to a rigid form in which it bonds adherently to the metal object and the glass panel.

Other objects of this invention will appear in the following description and appended claims, reference being had to the accompanying drawings forming a part of this specification wherein like reference characters designate corresponding parts in the several views.

On the drawings:
FIGURE 1 is a plan view of a channel-shaped frame member retained in a fixture block with a rope-like piece of adhesive gel material placed at the bottom of the frame member within its recess;

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
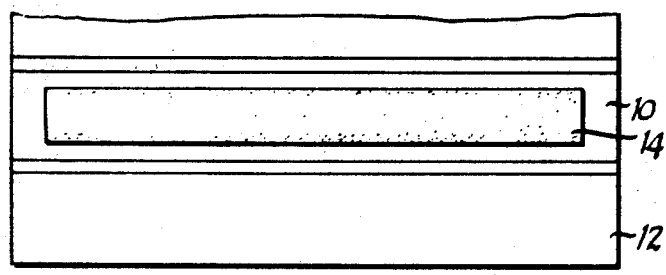

As shown on the drawings:

In FIGURE 1 there is shown a metal frame 10 which is U-shaped in cross-sectional configuration and which rests in a recess of a fixture block 12. Within the frame 10 there is a rope-like length of adhesive gel material 14 resting at the bottom of the frame. This gel material 14 is the bedding material which is used to bed a glass panel into the frame 10. The starting material for forming the rope-like length of adhesive gel material 14 is a resinous liquid adhesive material. This liquid adhesive material may be either a thermosetting or a thermoplastic type, and it should be curable by heat to an intermediate stage of cure in which it is a gel, and curable further by heat to a more rigid solid condition in which the adhesive material is strongly adherent both to metal and to glass. The bedding material should have the following properties:

(1) Resiliency—to provide a suitable bedding for the glass.

(2) Adherence—to provide a bond between the glass and the metal frame.

(3) Curability—to a gel state by the application of heat, and to a fully cured rigid state by the further application of heat.

(4) Resistance to weathering (sunlight, temperature changes and moisture absorption).

(5) Mechanical properties such as tensile strength, compressive strength, impact resistance and toughness sufficient to withstand the stress normally encountered in use of the final assembly.

One class of resins suitable as bonding or bedding materials are the polyurethane resins. Polyurethane resins are obtained by the reaction of polyisocyanates with organic compounds containing two or more active hydrogens to form polymers having free isocyanate groups. Under the influence of heat, the free isocyanate groups react to form a thermosetting material. A suitable thermosetting form may be prepared from castor oil and a triisocyanate. A suitable thermoplastic material is polyvinyl resin.

The first step of the method, then, is to heat liquid adhesive material to partially cure it into a gel form. After the liquid-adhesive material has been partially cured to the intermediate gel stage, the gel material may be formed into rope-like bodies such as the adhesive body 14 in FIGURE 1. This may be accomplished by manually mulling the gel material so as to form it to the desired shape, or it may be done mechanically by putting the gel material through an extruder which expresses rope-like bodies of gel material such as the body 14 of FIGURE 1. In either case, the material is in an intermediate stage of cure wherein due to its gel form it can be handled as a unit.

Figure 2:
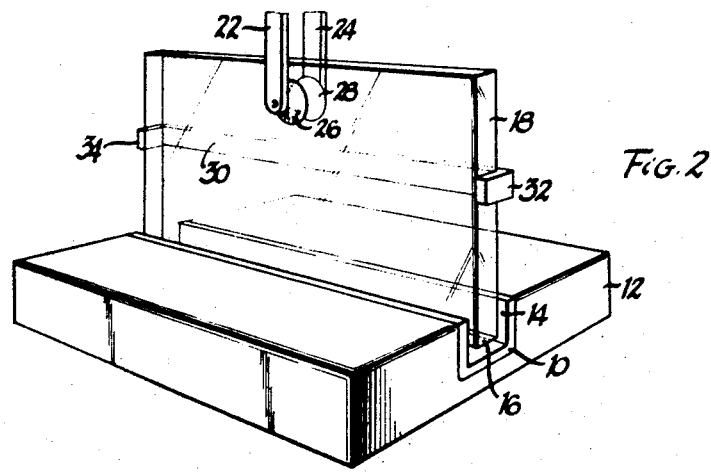
FIGURE 2 is a perspective view of the assembly of FIGURE 1 after a glass panel has been inserted into the recess of the frame, the glass panel being held in the correct position by suitable fixturing apparatus.

The next step of the method is to place a marginal edge portion 16 of a glass panel 18 into the recess of the channel-shaped frame member 10 and into contact with the adhesive gel material 14 in the recess. The resulting assembly is shown in FIGURE 2 wherein it may be seen that the edge 16 of panel 18 extends down into the recess of frame member 10 but does not touch the frame. When inserting the panel 18, the lower edge 16 contacts and displaces some of the adhesive gel material 14 up the sides of the panel in the spaces between the panel and the side surfaces of the recess within the frame 10. Thus, the adhesive gel material fills the spaces between the panel 18 and the frame 10. The amount of adhesive gel material which is initially placed in the frame 10 should be measured so as to allow for this displacement of gel material by the panel 18 when it is inserted into the frame.

The panel may be held in its inserted position by means of a pair of clamping arms 22 and 24 which have suction cups 26 and 28 thereon contacting opposite sides of the panel member 18. The arms 22 and 24 hold the panel 18 against both vertical and horizontal movement. An additional clamping arm 30 may be provided with inwardly bent end portions 32 and 34 which embrace the side edges of the panel 18 and hold it against movement longitudinally of the frame member 10. The arms 22, 24 and 30 may be connected to a suitable support stand (not shown) for holding the arms in place. The surface of the bracing arm 30 may be covered with rubber material so that it will not mar the glass.

After the panel 18 has been inserted into the frame in the manner shown in FIGURE 2, the adhesive gel material may be cured by heat to its fully cured stage wherein it is a rigid solid body adhering both to the glass panel 18 and to the metal frame member 10. This final curing step may be accomplished by placing the whole assembly of frame, panel and adhesive material into an oven which is maintained at an elevated temperature, say 250° to 300° F., for a short period of time, say about 45 seconds. When the method is practiced on a commercial scale, the assembly of frame, panel and adhesive material may be transported through an oven on a conveyor mechanism, such that the assembly remains in the oven long enough to cure the adhesive gel material to its rigid, solid form.

Figure 3:
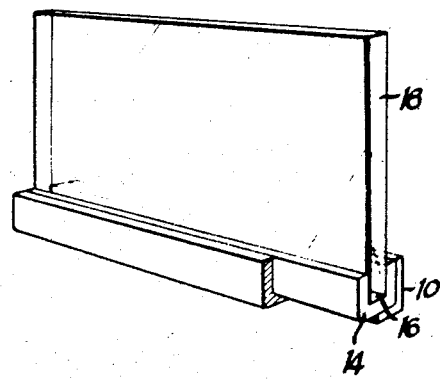
FIGURE 3 is a perspective view, partly broken away, of a frame and panel assembly after the panel has been bedded into the frame.

The assembly which results from the final curing step is shown in FIGURE 3. It may be seen clearly here how the adhesive material 14 extends along the bottom edge 16 of the panel and up its side surfaces so as to firmly bond to the glass panel. The metal frame 10 fits closely around the adhesive material 14, and it can be seen clearly how the adhesive material forms a bed for the panel in the frame.

Figure 4:
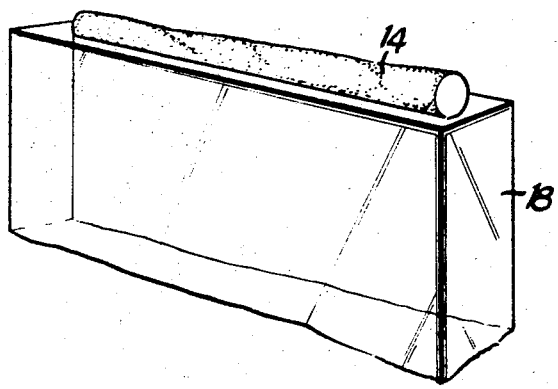
FIGURE 4 is a fragmentary perspective view of a glass panel having a rope-like length of adhesive gel material on a marginal edge which is to be inserted into a frame member.

FIGURE 4 illustrates an alternative way of placing the adhesive gel material between the panel and the frame. In FIGURE 4, a rope-like body or mass of adhesive gel material 14 has been placed on a top edge of a glass panel 18. The panel 18 may then be inserted into a metal frame 10 to bring the adhesive jell material 14 into contact with the surfaces in the recess of the metal frame. Some of the material 14 will be displaced around the side edges of the panel 18 in the same manner as was described in connection with FIGURE 2. After the panel 18 has been inserted into the frame, the assembly of panel, frame and adhesive material may be supported by fixturing apparatus in the manner described in connection with FIGURE 2. The rope-like body of adhesive material 14 is formed exactly as previously described, that is, by heating liquid adhesive material until it cures to an intermediate stage in which it is a gel. After the frame, panel and adhesive material have been assembled by the steps just referred to in connection with FIGURE 4, the assembly is placed in an oven at an elevated temperature of say 300° F. for example to cure the adhesive material fully to its rigid, solid form. The final assembly is the same as shown in FIGURE 3.

The invention thus provides a method of bedding a panel into a frame by the use of adhesive material which is first partially cured from a liquid stage to an intermediate stage in which it is a gel, and then after assembling the adhesive material with the panel and frame, it is cured further to its final stage in which it is a rigid, solid material that strongly bonds to the glass panel and to the metal frame. There is no handling of liquid material during the assembly steps, so there are no spillage or leakage problems. The frame and panel can be assembled and bonded with the adhesive material without the use of sealing members and without injecting the adhesive material under pressure. Thus, there are no problems of breaking the seal as there are when liquid adhesive material is injected into a sealed cavity formed by a panel and a frame together with sealing members. The assembly steps are straightforward and could be carried out at least partly automatically.

I claim:

1. A method of bonding metal objects to glass panels comprising the steps of partially curing a liquid resinous adhesive material until said material reaches a gel stage throughout the mass thereof in which it is soft and pliable, said adhesive gel material being curable further to a more rigid solid form in which said material is adherent to metal and to glass, placing a mass of said adhesive gel material between and in contact with a metal object and a glass panel to which the metal object is to be bonded, and curing said adhesive gel material to said more rigid solid form to bond said metal object firmly to said glass panel.

2. The method of claim 1 in which said liquid resinous adhesive material is curable by heat and is first cured to said gel stage by heating the same and is ultimately cured to said more rigid solid condition by heating the same.

3. The method of claim 1 in which said metal object is a frame having surfaces defining a recess for receiving a marginal edge of said glass panel, said marginal edge of said panel is placed in said recess and said mass of adhesive gel material is placed with said recess between and in contact with said frame surfaces and said marginal edge of said panel.

4. The method of claim 3 in which the placing of adhesive gel material between and in contact with said marginal edge portion of said panel and said frame surfaces forming said recess is caried out by initially placing said mass of adhesive gel material on said frame within said recess and then inserting said marginal edge portion of said panel into said recess and into contact with said adhesive gel material.

5. The method of claim 3 in which the placing of adhesive gel material between and in contact with said marginal edge portion of said panel and said frame surfaces forming said recess is caried out by initially placing said mass of adhesive gel material on said marginal edge portion of said panel and then inserting said marginal edge portion of said panel into said recess and thereby bringing said adhesive gel material thereon into contact with said frame surfaces.

6. A method of bedding a glass panel into a metal frame having surfaces forming a recess to receive a marginal edge of said panel, said method comprising the steps of heating a liquid resinous adhesive material which is curable by heat until said adhesive material reaches a stage of cure in which it is a soft, pliable gel throughout the mass thereof, said adhesive gel material being curable further by heat to a more rigid, solid form in which said material is adherent to metal and glass, placing a marginal edge portion of said panel in said recess of said frame and also placing a mass of said adhesive gel material between and in contact with said marginal edge portion of said panel and said frame surfaces forming said recess, and heating said adhesive gel material to cure the same to said more rigid, solid form and thereby bond said panel and said frame together and form a bed for said panel in said frame.

7. The method of claim 6 in which the placing of adhesive gel material between and in contact with said marginal edge portion of said panel and said frame surfaces forming said recess is carried out by initially placing said mass of adhesive gel material on said frame within said recess and then inserting said marginal edge portion of said panel into said recess and into contact with said adhesive gel material.

8. The method of claim 6 in which the placing of adhesive gel material between and in contact with said marginal edge portion of said panel and said frame surfaces forming said recess is carried out by initially placing said mass of adhesive gel material on said marginal edge portion of said panel and then inserting said marginal edge portion of said panel into said recess and thereby bringing said adhesive gel material thereon into contact with said frame surfaces.

References Cited

UNITED STATES PATENTS

| | | | |
|---|---|---|---|
| 2,768,475 | 10/1956 | Seelen et al. | 156—109 X |
| 3,008,862 | 11/1961 | Haine et al. | 156—244 |
| 3,098,698 | 7/1963 | Glynn | 264—261 |
| 3,226,457 | 12/1965 | Smith | 264—214 X |
| 3,272,900 | 9/1966 | Ryan et al. | 264—261 X |
| 3,293,977 | 12/1966 | Dalton et al. | 85—37 |
| 3,327,029 | 6/1967 | Pincus et al. | 264—336 |
| 3,350,475 | 10/1967 | Watanabe et al. | 264—331 X |
| 3,361,845 | 1/1968 | Watanabe et al. | 264—259 X |
| 3,381,340 | 5/1968 | Chapin | 264—261 X |
| 3,402,084 | 9/1968 | Jacobi et al. | 156—109 |
| 3,415,701 | 12/1968 | Haldane et al. | 156—244 |

HAROLD ANSHER, Primary Examiner

U.S. Cl. X.R.

156—109, 244, 295; 161—190, 203, 219; 264—177, 261, 325, 331